United States Patent [19]
Sevic

[11] Patent Number: 6,024,875
[45] Date of Patent: Feb. 15, 2000

[54] METHOD FOR CONTROLLING THE OXYGEN CONTENT OF THE WATER AT THE OUTLET OF A UNIT FOR DISSOLVING OXYGEN IN WATER, AND UNIT FOR IMPLEMENTING THE METHOD

[75] Inventor: Bohumil Sevic, St-Urbin, France

[73] Assignee: L'Air Liquide Societe Anonyme Pour L'Etude Et L'Exploitation Des Procedes Georges Claude, Paris, France

[21] Appl. No.: 09/076,837

[22] Filed: May 13, 1998

[30] Foreign Application Priority Data

May 29, 1997 [FR] France .................................. 97 06606

[51] Int. Cl.⁷ .................................. C02F 3/26; C02F 1/74
[52] U.S. Cl. .................... 210/614; 210/739; 210/96.1; 210/143
[58] Field of Search ..................... 210/614, 739, 210/745, 746, 758, 96.1, 141–143

[56] References Cited

U.S. PATENT DOCUMENTS

| | | | |
|---|---|---|---|
| 4,255,266 | 3/1981 | Moreaud | 210/614 |
| 4,818,408 | 4/1989 | Hamamoto | 210/614 |
| 5,066,392 | 11/1991 | Kneer | 210/96.1 |
| 5,506,096 | 4/1996 | Helmo | 210/614 |
| 5,811,289 | 9/1998 | Lewandowski et al. | 210/614 |

FOREIGN PATENT DOCUMENTS

| | | |
|---|---|---|
| 292374 | 11/1988 | European Pat. Off. . |
| 0645080 A1 | 3/1995 | European Pat. Off. . |
| 0796556 A1 | 9/1997 | European Pat. Off. . |
| 2352752 | 12/1977 | France . |
| 86/03734 | 7/1986 | WIPO . |

OTHER PUBLICATIONS

Search Report for related European Patent Application No. EP 98 40 0988;.

Search Report for related French Application FR 9706606.

*Primary Examiner*—Thomas G. Wyse
*Attorney, Agent, or Firm*—Burns, Doane, Swecker & Mathis, L.L.P.

[57] ABSTRACT

The invention relates to a method of controlling the oxygen content of water at an outlet of a unit for dissolving oxygen in water. The method comprises measuring the oxygen content $C_o$ of the water at the outlet of the unit with a sensor, and comparing the oxygen content $C_o$ with a setpoint value $C_{set}$. If the measured oxygen content $C_o$ is less than the setpoint value $C_{set}$, a cycle of feeding oxygen to the unit is initiated. The feed cycle comprises a period $T_i$ of injecting oxygen into the unit, during which a valve controlling the flow rate of the oxygen feeding the unit is in the open position, and a pause period $T_p$ during which the valve is in the closed position. The pause period corresponds substantially to the inertia of the unit in responding to the oxygen being injected. The invention also relates to units for dissolving oxygen in water. Particular applicability is found in fish farming.

9 Claims, 2 Drawing Sheets

METHOD FOR CONTROLLING THE OXYGEN CONTENT OF THE WATER AT THE OUTLET OF A UNIT FOR DISSOLVING OXYGEN IN WATER, AND UNIT FOR IMPLEMENTING THE METHOD

BACKGROUND OF THE INVENTION

1. Field of the Invention

The invention relates to a method for controlling the oxygen content of the water at the outlet of a unit for dissolving oxygen in water, intended in particular for fish farming.

2. Description of the Related Art

In fish farming, it is common practice to supply fish culture tanks with water in which the oxygen content has been increased using a unit for dissolving oxygen in water, in order to make it possible for the fish living in these culture tanks to breathe. This content needs to be tailored throughout a day to the oxygen consumption of the fish in the tanks.

Units for dissolving oxygen in water are known which comprise components implementing complex methods of controlling the oxygen content of the water at the outlet of a unit of this type. These methods are, for example, of the "P.I.D." type, that is to say control by proportional, integral and derivative action, or proportional control methods requiring complicated control systems comprising a large number of solenoid valves.

SUMMARY OF THE INVENTION

The object of the invention is to provide a method of controlling the oxygen content of the water at the outlet of a unit for dissolving oxygen in water which is simpler than those described above.

To this end, the invention relates to a method of controlling the oxygen content of the water at the outlet of a unit for dissolving oxygen in water, in particular intended for fish farming, in which a sensor is used to measure the oxygen content $C_o$ of the water at the outlet of the unit, and the content $C_o$ measured at the outlet of the unit is compared with a setpoint value $C_{set}$, characterized in that if the measured content $C_o$ is less than the setpoint value $C_{set}$, a cycle of feeding oxygen to said unit is initiated, a feed cycle being composed of a period $T_i$ of injecting oxygen into the unit, during which a valve controlling the flow rate of oxygen feeding said unit is in the open position, and of a pause period $T_p$ during which said valve is in the closed position, said pause period corresponding substantially to the inertia of the unit in responding to oxygen being injected.

The method according to the invention may further include one or more of the following characteristics:

the ratio between the duration of the injection period $T_i$ and the duration of the pause period $T_p$ is substantially constant, for a unit for dissolving oxygen containing a volume of water $V_w$, the pause period $T_p$ is substantially defined by the equation:

$$T_p = \frac{V_w}{Q_{H_2O}}$$

the oxygen content $C_i$ of the water at the inlet of the unit is also measured, and the total duration $T_{tot}$ of a feed cycle is substantially defined by the following equation:

$$T_{tot} = \frac{(C_{set} - C_o)V_g Rd_m}{Q_{H_2O}(C_o - C_i)E}$$

where $V_g$ is the volume of the gas phase contained in the unit, $Rd_m$ is the actual dissolving efficiency of the unit and $E$ is the theoretical coefficient of oxygen dissolving efficiency, during the period $T_i$, oxygen is injected with a flow rate $Q_i$ substantially defined by the following equation:

$$Q_i = \frac{Q_{H_2O} V_g (C_o - C_i)(C_{set} - C_o)}{Rd_m V_g (C_{set} - C_o) - V_w E(C_o - C_i)}.$$

The invention further relates to a unit for dissolving oxygen in water, comprising an oxygen chamber connected to an oxygen source via a feed pipe, characterized in that it comprises an all or nothing solenoid valve which can assume either a closed position or an open position and which is arranged in the feed pipe, a sensor for measuring the oxygen content $C_i$ of the water to be treated, as well as a sensor for measuring the oxygen content $C_o$ dissolved in the water at the outlet of the unit, and a central controller comprising means for processing the signals delivered by the two measuring sensors as well as means which control the solenoid valve and are driven by the processing means.

The unit according to the invention may further include one or more of the following characteristics:

the processing means comprise means for comparing the content $C_o$ with the setpoint value $C_{set}$ stored in a memory, and means for calculating the duration of the injection period $T_i$, the means for controlling the solenoid valve comprise a memory containing the duration of the pause period $T_p$ and, connected to this memory as well as to the calculation means, a timer for controlling the opening and closing times of the solenoid valve.

BRIEF DESCRIPTION OF THE DRAWINGS

Other characteristics and advantages of the invention will emerge from the following description, given by way of example, without implying any limitation, with reference to the appended drawings, in which.

DETAILED DESCRIPTION OF PREFERRED EMBODIMENTS OF THE INVENTION

Figure 1:
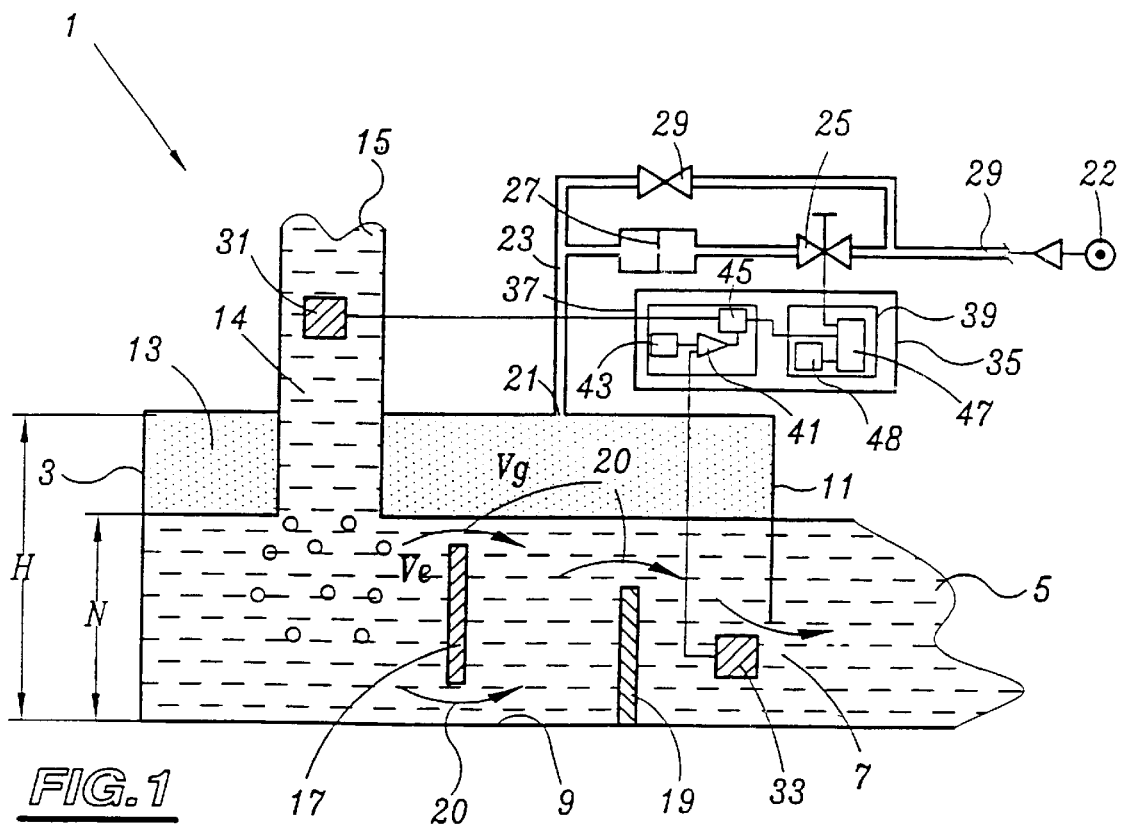
FIG. 1 is an outline diagram of a unit for dissolving oxygen in water.

FIG. 1 depicts a unit 1 for dissolving oxygen in water intended for fish farming.

This unit 1 comprises a water oxygenation chamber 3 which contains a total treatment volume $V_{tot}$. This chamber 3 is in communication with a fish culture tank 5 via an outlet opening 7 made close to the bottom 9 of the chamber 3, in a side wall 11 thereof. Because the chamber 3 and the tank 4 communicate through the opening 7, the water level N in the chamber 3 corresponds to that of the culture tank 5. The water level of the tank 5 is kept constant so that the level N in the chamber 3 is also constant during operation of the unit 1.

The height H of the chamber 3 is greater than the water level N, so that the total volume $V_{tot}$ is divided into an upper volume $V_g$, containing a gas phase with a high proportion of oxygen intended to be dissolved solved in water, and a volume $V_w$ containing the water under treatment. Since the water level N in the chamber 3 is constant during operation of the unit 1, the volumes $V_g$ and $V_w$ are also constant.

Through an opening 14 provided in its upper wall 13, the chamber 3 is connected to a pipe 15 for feeding water to be treated. Since a unit for dissolving oxygen in water is designed for a nominal flow rate of water to be treated, the flow rate $Q_{H2O}$ of water to be treated coming from the pipe 15 is substantially constant.

During operation, the water leaving the pipe 15 passes through the gas phase and flows into the liquid phase so as to create an emulsion with gas bubbles in order to dissolve oxygen from the gas phase into the water contained in the chamber 3. By virtue of the emulsion with the gas bubbles, the gas-liquid transfer is increased significantly.

It should be noted that, besides oxygen, the gas phase also contains other gases, for example nitrogen and argon. These other gases originate primarily from the water to be treated, which already contains some quantity of dissolved gases. These other gases are partly released in the emulsion and alter the composition of the gas phase.

In order to recover the excess gas bubbles which have not dissolved in the water, walls 17 and 19 for deflecting the flow of water are arranged in the chamber 3. The deflected flow of water is indicated by arrows 20.

Through an opening 21 provided in its upper wall 13, the chamber 3 is further connected to an oxygen source 22 via a pipe 23 for feeding oxygen to the unit 1. A so-called "all or nothing" solenoid valve 25, that is to say a solenoid valve which assumes either a closed position or an open position, and a diaphragm 27 for controlling the flow rate of oxygen in the pipe 23 when the solenoid valve 25 is in its open position are arranged in line in this pipe 23.

A manually controlled flow meter 29 is arranged in parallel with the solenoid valve 25 and the diaphragm 27 in the oxygen feed pipe 23. This manually controlled flow meter 29 is used as a safety valve in case the solenoid valve 25 malfunctions and, as will be explained below, to calibrate the unit 1.

Further, the unit 1 comprises two sensors 31 and 33 for measuring the oxygen content of the water, one 31 of which is arranged in the pipe 15 in order to measure the oxygen content $C_i$ of the water to be treated, and the other 33 of which is arranged close to the opening 7, at the outlet of the chamber 3, in order to measure the dissolved oxygen content $C_o$ in the water at the outlet of the unit.

The two sensors 31 and 33 are connected to a central controller 35 comprising means 37 for processing the signals delivered by the two sensors 31 and 33, and means 39 for controlling the solenoid valve 25.

The processing means 37 comprise means 41 for comparing the content $C_o$ with a setpoint value $C_{set}$ stored in a memory 43, and means 45 for calculating an opening time for the solenoid valve, that is to say the duration of an injection period $T_i$ during which the solenoid valve 25 is in the open position and oxygen is fed to the unit 1.

The means 39 for controlling the solenoid valve 25 comprise a timer 47 for controlling the opening and closing times of the solenoid valve 25 and, connected to this timer 47, a memory 48 containing a duration for a pause period $T_p$ during which, after an injection period $T_i$, the valve is kept closed.

The central controller 35 is, for example, formed by a microcomputer equipped with interfaces designed to acquire the signals delivered by the sensors 31 and 33, and to send opening or closing commands to the solenoid valve 25, and including a memory in which a suitable computer program is loaded.

Figure 2:
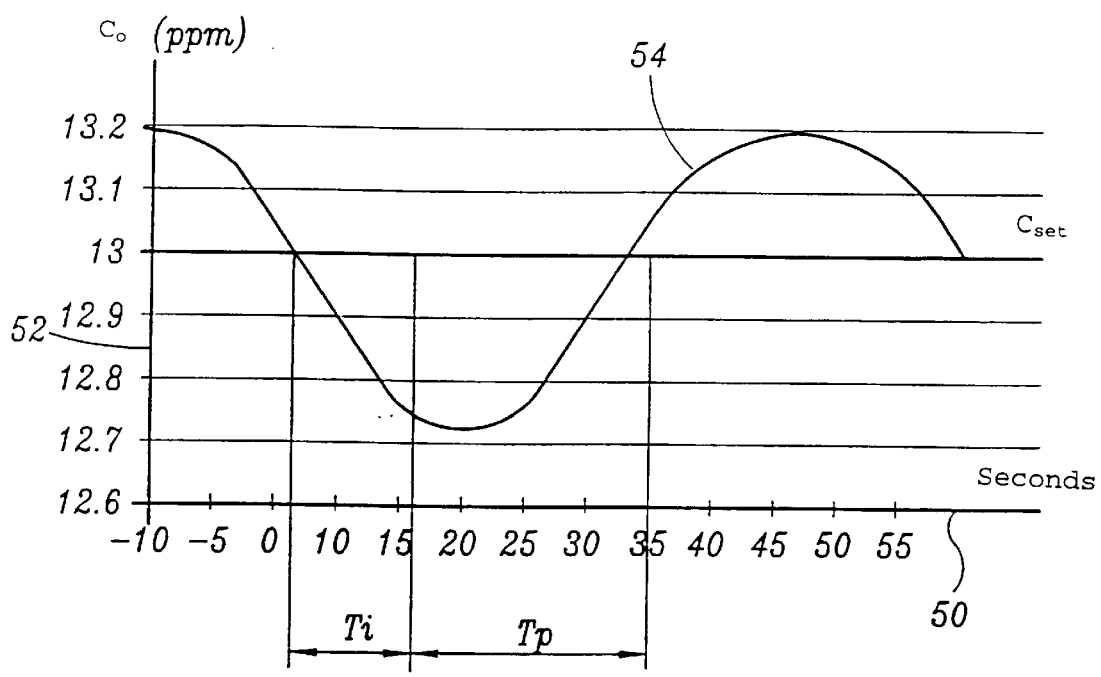
FIG. 2 is a graph which, as a function of time, shows the oxygen content of the water at the outlet of a dissolving unit and illustrates the control method according to the invention.

FIG. 2 shows a graph illustrating the control method of the invention. The time in seconds is plotted on the abscissa axis 50, and the oxygen content $C_o$ in the water at the outlet of the unit 1 is plotted on the ordinate axis 52. This graph shows a curve 54 of the variation of $C_o$ as a function of time.

According to the method of the invention, the sensor 33 is used to measure the oxygen content $C_o$ of the water at the outlet of the unit 1. This measured value $C_o$ is compared in the comparison means 41 with the setpoint value $C_{set}$ stored in the memory 43.

If the measured content $C_o$ is less than the setpoint value $C_{set}$, as for example at time t=2 s in FIG. 2, a cycle of feeding the unit 1 is initiated. A feed cycle is composed of a period $T_i$ of injecting oxygen into the chamber 3, during which the solenoid valve 25 is in the open position, and of a pause period $T_p$ during which the solenoid valve 25 is in the closed position. For this purpose, the comparison means 41 send a control signal comprising in particular the measured value $C_o$ to the calculation means 45 so that they can determine the duration of the period $T_i$ on the basis of the characteristics of the unit 1 and the measurements of $C_o$ and $C_i$. This duration of the period $T_i$ is sent to the timer 47.

During the injection period $T_i$ the timer 47 keeps the solenoid valve 25 in the open position, and oxygen is injected with a flow rare $Q_i$ determined by the pressure upstream of the solenoid valve 25 and by the diameter of the diaphragm 27. The timer 47 then keeps the solenoid valve 25 in the closed position for the period $T_p$. The duration of the period $T_p$ corresponds substantially to the inertia of the unit in responding to oxygen being injected into the unit 1, and is defined by the following equation:

$$T_p = \frac{V_w}{Q_{H_2O}} \quad (1)$$

As can be seen on the curve 54 in FIG. 2, the content $C_o$ decreases further during the injection period on account of the inertia of the unit in responding, and then rises during the pause period. At the end of the pause period $T_p$, a value of $C_o$ is obtained which is a response to the amount of oxygen injected during the injection period.

If, after the injection cycle, that is to say after a cycle period $T_{tot}=T_i+T_p$, $C_o$ is still less than $C_{set}$, the comparison means 41 initiate a new injection cycle. As can be seen in FIG. 2, the control method of the invention makes it possible to obtain an oscillating variation in $C_o$ around $C_{set}$.

By virtue of the fact that the solenoid valve 25 can assume only two positions, the closed position and the open position, and by virtue of the control method of the invention, the content $C_o$ at the outlet of the unit 1 is regulated in simple, reliable and accurate fashion.

The Applicant Company has observed that the ratio between the duration of the injection period $T_i$ and the duration of the pause period $T_p$ is substantially constant.

In order for the amplitude of the oscillations of $C_o$ around $C_{set}$ to be small, the characteristics of the unit 1 and the measurements of $C_o$ and $C_i$ are used to determine the durations of the periods $T_i$ and $T_p$ as well as the flow rate $Q_i$ with which oxygen in the gas phase is injected during the period $T_i$ via the pipe 23.

The unit 1 is set up with a view to dissolving a certain amount of oxygen in the water per unit time, that is to say an average oxygen flow rate $Q_{o2f}$, this flow rate being determined by fish-farming specifications. In order to make it possible to supply this average flow rate of oxygen dissolved in water $Q_{o2f}$, it is necessary to know the dissolving characteristics of the unit.

Figure 3:
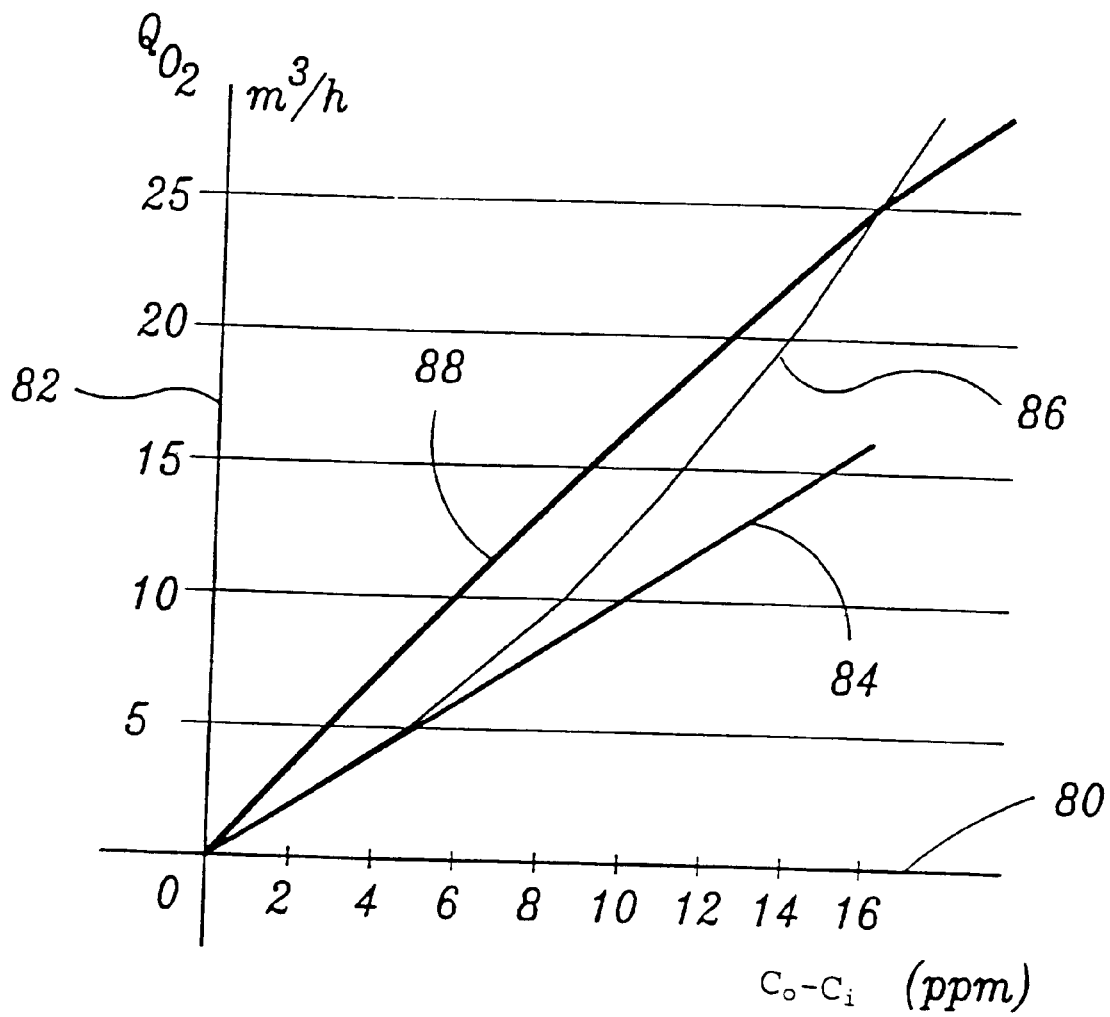
FIG. 3 represents a graph showing calibration curves of a unit for dissolving oxygen in water.

FIG. 3 shows on a graph calibration curves of a unit 1 for dissolving oxygen in water.

The difference in ppm by mass (parts per million by mass) between the oxygen content $C_o$ dissolved solved in the water at the out let of the unit and the oxygen content $C_i$ in the water to be treated, is plotted on the abscissa axis 80. An average oxygen flow rate $Q_{o2}$ in m³/h is plotted on the ordinate axis 82. Three curves 84, 86 and 88 are represented on the graph.

Curve 84 shows the average flow rate of oxygen dissolved in the water $Q_{o2f}$ as a function of the difference $(C_o-C_i)$ between the oxygen contents in the water, respectively at the outlet and at the inlet of the unit 1. $Q_{o2f}$ is determined by the following equation:

$$Q_{O2f} = (C_o - C_i) Q_{H_2O} \tag{2}$$

This means, in order to obtain a difference $(C_o-C_i)$ between the oxygen contents in the water, respectively at the outlet and at the inlet of the unit 1, and with a flow rate of water to be treated $Q_{H2O}$ which is constant for a given unit, it is necessary to dissolve the average flow rate $Q_{o2f}$. The curve 84 is a curve calculated for a given flow rate $Q_{H2O}$.

In particular because of the gases other than oxygen which are dissolved in the water to be treated and which are released during the treatment in the chamber 3, so that they modify the composition of the gas phase in the chamber 3, $Q_{o2f}$ does not directly correspond to the average flow rate of oxygen $Q_m$ which needs to be injected in the gas phase. This average oxygen flow rate $Q_m$ is represented by curve 86 as a function of $(C_o-C_i)$. It is determined by the following equation:

$$Q_m = (C_o - C_i) Q_{H_2O} \frac{1}{Rd_m} \tag{3}$$

$Rd_m$, is the actual dissolving efficiency of the unit 1. Curve 86 was obtained experimentally by keeping the solenoid valve 25 closed and by varying the flow rate of oxygen injected into the chamber 3 by means of the manually controlled flow meter 29 while measuring $C_o$ and $C_i$.

For, for example, a maximum difference $(C_o-C_i)$ of 16 ppm (stipulated by the fish farming schedule), it is necessary to dissolve, on average, about 16 m³/h of oxygen in the water (see curve 84), but to inject on average 25 m³/h of oxygen into the chamber 3 (see curve 86). On the basis of these curves 84 and 86, the actual dissolving efficiency $Rd_m$ of the unit 1 is determined, which is then defined by the following equation:

$$Rd_m = \frac{Q_{o2f}}{Q_m} \tag{4}$$

Curve 88 is the average oxygen flow rate $Q_{O2E}$ required of the solenoid valve 25 control. The solenoid valve 25 and the diameter of the diaphragm 27 are then chosen so as to obtain $Q_m$ for a maximum difference $(C_o-C_i)$ of 16 ppm stipulated by the fish farming schedule. For this operating point, $Q_{O2E}$ and $Q_m$ are then equal.

In general, the solenoid valve 25 and the diaphragm diameter 27 will be chosen in such a way that the curve 88 is fairly close to the curve 86 in order to obtain a good control result.

On the basis of these characteristics of the unit 1, the durations $T_{tot}$, $T_i$, $T_p$ and the oxygen flow rate $Q_i$ with which oxygen is injected into the unit 1 via the pipe 23 are determined.

In order to inject a sufficient amount of oxygen on average, $T_i$, $T_p$ as well as $Q_m$, and $Q_i$ satisfy the following equation:

$$T_i Q_i = (T_i + T_p) Q_m \tag{5}$$

This equation means that the amount of oxygen $T_i Q_i$ injected during the period $T_i$ corresponds to the average quantity $(T_i + T_p) Q_m$ which is to be injected into the chamber 3 in order to obtain the required increase in the oxygen content.

Further, injecting the amount of oxygen $T_i Q_i$ into the volume $V_g$ of the gas phase will lead to an increase $\Delta C'$ of the oxygen content in the gas phase given by the following equation:

$$\Delta C' = \frac{Q_i T_i}{V_g} \tag{6}$$

This increase $\Delta C'$ needs to be fairly large in order to cause an increase in the oxygen content of the water at the outlet of the unit. $\Delta C'$ can then be expressed by the following equation:

$$\Delta C' = \frac{(C_{set} - C_o)}{E} \tag{7}$$

where E is the theoretical efficiency coefficient with which oxygen is dissolved in the water, given by the following equation:

$$E = \frac{k_l a \tau}{1 - k_l a \tau} \tag{8}$$

$k_l$ being a coefficient of mass transfer into the liquid film, a being the liquid interfacial specific area and $\tau$ being the transit time of the liquid phase in the chamber 3. For further details regarding this coefficient E, reference may for example be made to the thesis defended on May 18, 1978 at the Université Paul Sabatier de Toulouse by Michel Roustant, Ingénieur INSA, entitled "Contribution à l'étude de phéphénomènes d'agitation et de transfert de matière dans des réactions. gaz-liquide" [Contribution to the study of agitation and mass transfer phenomena in gas-liquid reactions].

By combining equations (3), (5), (6) and (7), the following equations are obtained for $Q_i$, $T_i + T_p = T_{tot}$, and $T_i$:

$$Q_i = \frac{Q_{H_2O} V_g (C_o - C_i)(C_{set} - C_o)}{Rd_m V_g (C_{set} - C_o) - V_w E (C_o - C_i)} \tag{9}$$

-continued $$T_{tot} = \frac{(C_{set} - C_o)V_g Rd_m}{Q_{H_2O}(C_o - C_i)E} \quad (10)$$

$$T_i = T_{tot} - T_p \quad (11)$$

In this way, all the control parameters needed for implementing the method of the invention are defined. The method is distinguished by its simplicity and by the fact that, as the control element in the oxygen feed pipe, it requires only an "all or nothing" valve.

I claim:

1. A method of controlling the oxygen content of water at an outlet of a unit for dissolving oxygen in water, the method comprising:

measuring the oxygen content $C_o$ of the water at the outlet of the unit with a sensor;

comparing the oxygen content $C_o$ with a setpoint value $C_{set}$; and if the measured oxygen content $C_o$ is less than the setpoint value $C_{set}$, a cycle of feeding oxygen to the unit is initiated, the feed cycle comprising a period $T_i$ of injecting oxygen into the unit, during which a valve controlling the flow rate of the oxygen feeding the unit is in the open position, and a pause period $T_p$ during which the valve is in the closed position, the pause period corresponding substantially to the inertia of the unit in responding to the oxygen being injected.

2. The method according to claim 1, wherein the ratio between the duration of the injection period $T_i$ and the duration of the pause period $T_p$ is substantially constant.

3. The method according to claim 1, wherein the unit contains a volume of water $V_w$ and has a nominal flow rate of treated water $Q_{H_2O}$, and wherein the pause period $T_p$ is substantially defined by the equation:

$$T_p = \frac{V_w}{Q_{H_2O}}.$$

4. The method according to claim 1, further comprising measuring the oxygen content $C_i$ of the water at the inlet of the unit, wherein the total duration $T_{tot}$ of the feed cycle is substantially defined by the following equation:

$$T_{tot} = \frac{(C_{set} - C_o)V_g Rd_m}{Q_{H_2O}(C_o - C_i)E}$$

wherein $V_g$ is the volume of gas phase contained in the unit, $Rd_m$ is the actual dissolving efficiency of the unit and E is the theoretical coefficient of oxygen dissolving efficiency.

5. The method according to claim 4, wherein during the injection period $T_i$, oxygen is injected with a flow rate $Q_i$ substantially defined by the following equation:

$$Q_i = \frac{Q_{H_2O}V_g(C_o - C_i)(C_{set} - C_o)}{Rd_m V_g(C_{set} - C_o) - V_w E(C_o - C_i)}.$$

6. The method of claim 1, further comprising employing the oxygen content-controlled water in fish farming.

7. A unit for dissolving oxygen in water, the unit comprising an oxygen chamber connected to an oxygen source via a feed pipe, an all or nothing solenoid valve which can assume either a closed position or an open position and which is arranged in the feed pipe, a sensor for measuring the oxygen content $C_i$ of the water to be treated, a sensor for measuring the oxygen content $C_o$ dissolved in the water at an outlet of the unit, and a central controller comprising a signal processor adapted to process signals delivered by the measuring sensors and a solenoid valve controller driven by the signal processor.

8. The unit according to claim 7, wherein the signal processor comprises means for comparing the oxygen content $C_o$ with a setpoint value $C_{set}$ stored in a memory, and means for calculating the duration of the injection period $T_i$.

9. The unit according to claim 8, wherein the solenoid valve controller comprises a memory containing the duration of the pause period $T_p$ and, connected to the memory and the calculation means, a timer for controlling the opening and closing times of the solenoid valve.

* * * * *